United States Patent [19]
Trushell

[11] Patent Number: 5,552,665
[45] Date of Patent: Sep. 3, 1996

[54] ELECTRIC LAMP HAVING AN UNDERCOAT FOR INCREASING THE LIGHT OUTPUT OF A LUMINESCENT LAYER

[75] Inventor: Charles Trushell, Morgantown, W. Va.

[73] Assignee: Philips Electronics North America Corporation, New York, N.Y.

[21] Appl. No.: 366,134

[22] Filed: Dec. 29, 1994

[51] Int. Cl.⁶ .............................. H01J 61/35; H01J 61/40
[52] U.S. Cl. ............................................. 313/489; 313/112
[58] Field of Search .................................... 313/110, 112, 313/489, 113, 493

[56] References Cited

U.S. PATENT DOCUMENTS

| | | |
|---|---|---|
| 2,386,277 | 10/1945 | Smith . |
| 3,541,377 | 11/1970 | Nagy . |
| 3,581,139 | 5/1971 | Halt et al. ............................. 313/109 |
| 3,599,029 | 8/1971 | Martyay ................................ 313/109 |
| 3,617,357 | 11/1971 | Nagy ..................................... 117/97 |
| 3,757,938 | 9/1973 | Wachtel ................................. 209/5 |
| 3,833,399 | 9/1974 | Martyn et al. ....................... 117/33.5 |
| 3,842,306 | 10/1974 | Henderson et al. ................... 313/116 |
| 3,866,396 | 5/1975 | Hammer et al. ...................... 313/486 |
| 3,875,455 | 4/1975 | Kaduk et al. ......................... 313/489 |
| 3,890,530 | 7/1975 | Hammer et al. ...................... 313/489 |
| 3,963,954 | 6/1976 | Milke et al. .......................... 313/489 |
| 3,967,153 | 6/1976 | Milke et al. .......................... 313/489 |
| 4,020,385 | 4/1977 | Lagos ................................... 313/489 |
| 4,058,639 | 11/1977 | Schreurs . |
| 4,079,288 | 3/1978 | Maloney et al. ..................... 313/489 |
| 4,585,673 | 4/1986 | Sigai ..................................... 427/213 |
| 4,670,688 | 6/1987 | Sigai et al. ........................... 313/489 |
| 4,710,674 | 12/1987 | Sigai ..................................... 313/489 |
| 4,778,581 | 10/1988 | Sigai et al. ........................ 204/192.15 |
| 4,797,594 | 1/1989 | Sigai et al. ........................... 313/488 |
| 4,825,124 | 4/1989 | Sigai ..................................... 313/486 |
| 4,952,422 | 8/1990 | Pappalardo et al. .................. 427/67 |
| 4,979,893 | 12/1990 | Pappalardo et al. .................. 427/67 |
| 4,999,219 | 3/1991 | Klinedinst et al. ................... 427/69 |
| 5,008,789 | 4/1991 | Arai et al. ............................ 362/255 |

Primary Examiner—Nimeshkumar D. Patel
Attorney, Agent, or Firm—Brian J. Wieghaus

[57] ABSTRACT

An electric lamp having a luminescent layer on the lamp envelope which produces visible light when impinged by ultraviolet radiation generated within the lamp. An undercoat for the luminescent layer increases the luminous efficacy of the lamp. The undercoat comprises an agglomerated particulate material of predominantly gamma alumina having a primary crystallite size of less than about 0.05 μm. The undercoat is effective to increase the luminous efficacy of certain fluorescent lamps so that they meet the minimum efficacy requirements of the Energy Policy Act of 1992.

20 Claims, 3 Drawing Sheets

ELECTRIC LAMP HAVING AN UNDERCOAT FOR INCREASING THE LIGHT OUTPUT OF A LUMINESCENT LAYER

BACKGROUND OF THE INVENTION

1) Field Of The Invention

The invention concerns an improvement in electric lamps having a lamp envelope with a phosphor coating, and more particularly, to an undercoat for increasing the luminous efficacy of such lamps.

2) Description Of The Prior Art

Low pressure mercury vapor lamps, more commonly known as fluorescent lamps, have a lamp envelope with a filling of mercury and a rare gas and in which a gas discharge is maintained during lamp operation. The radiation emitted by the gas discharge is mostly in the ultraviolet region of the spectrum, with only a small portion in the visible spectrum. The inner surface of the lamp envelope has a luminescent coating, often of a blend of phosphors, which emits visible light when impinged by the ultraviolet radiation.

Lighting accounts for approximately 20–25% of the electricity used annually in the United States. For stores, offices and warehouses, lighting may account for up to 50% of their electrical consumption. Lighting is a primary focus of The National Energy Policy Act (EPACT) of 1992, whose goal is to drastically reduce national energy consumption. This act mandates energy efficiency standards for various lamp types in terms of lamp efficacy and color rendering index. Luminous efficacy is a measure of the useful light output in relation to the energy input to the lamp, in lumens per watt (LPW). The EPACT standards for fluorescent lamps are listed in Table 1 below. Fluorescent lamps which do not meet these minimum standards cannot be sold in the United States beginning with certain dates in 1994.

| | FLUORESCENT LAMP STANDARDS | | |
| --- | --- | --- | --- |
| LAMP | NOMINAL LAMP WATTAGE | MINI- MUM CRI | MINIMUM AVERAGE LAMP EFFICACY (LPW) |
| 4-FOOT | >35 W | 69 | 75.0 |
| MEDIUM BI-PIN | ≦35 W | 45 | 75.0 |
| 2-FOOT | >35 W | 69 | 68.0 |
| U-BENT | ≦35 W | 45 | 64.0 |
| 8-FOOT | >65 W | 69 | 80.0 |
| SLIMLINE | ≦65 W | 45 | 80.0 |
| 8-FOOT | >100 W | 69 | 80.0 |
| HIGH OUTPUT | ≦100 W | 45 | 80.0 |

Many fluorescent lamps on the market prior to 1994 do not meet these mandated minimum efficacy requirements. Such lamps include F96T12 and F40T12 CW (cool white), F96T12 and F40T12 Daylite, and F96T12 and F40T12 warm white. The efficacy of such lamps must be raised to the EPACT standards or they will no longer be allowed to be manufactured.

Luminous efficacy is dependent on the efficiency at which the phosphor coating converts the ultraviolet radiation from the gas discharge into visible light, on electrode losses (specifically the cathode drop), thermal losses and losses in the column gas discharge. Lamp electrodes have already been highly optimized by the lamp industry for specific applications. Losses in the column discharge are primarily a function of lamp geometry. Thus, for fluorescent lamps of a given length, diameter and lifetime, a further reduction of losses at the electrodes and in the discharge would be extremely difficult to attain.

The fluorescent layer is the single most important contributing factor in determining the luminous efficacy of fluorescent lamps. Increasing lamp efficacy through development of new or improved phosphors, however, would be very time consuming, as well as expensive. Research and development in phosphors is accomplished primarily through large numbers of experiments because results are not very predictable theoretically. Substitution of known high performing phosphors for other, lower performing ones is often not feasible either. While certain phosphors, such as the so-called narrow band and rare earth phosphors, produce high luminous efficacy and excellent color rendering in lamps intended for the high end of the market, they would be too expensive for use in lamps intended for standard or low cost applications which presently employ the relatively low cost halophosphate phosphors. Furthermore, the thickness or coating weight of each type of phosphor has already been optimized for the greatest light output. In general, if a luminescent layer is too thin, some of the U.V. radiation from the discharge will pass through the layer without being converted into visible light. If the layer becomes too thick, however, the phosphor itself absorbs and/or reflects a portion of the visible light generated in the region of the layer near the discharge.

Other types of lamps also include a luminescent layer for providing or improving their photometric parameters. These include high pressure discharge lamps, such as high pressure mercury vapor and certain metal halide lamps, which have an arc tube which at least partly emits U.V. radiation.

Accordingly, it is an object of the invention to provide a cost effective mechanism of increasing the luminous efficacy of lamps having a luminescent layer.

It is another object of the invention to increase the luminous efficacy of certain low pressure mercury vapor fluorescent lamps to meet the EPACT standards.

SUMMARY OF THE INVENTION

Generally speaking, an electric lamp according to the invention includes a lamp envelope having an inner surface and means within the lamp envelope for generating ultraviolet radiation. A layer of a luminescent material is adjacent the inner surface of the lamp envelope for generating visible light when impinged by the ultraviolet radiation. The lamp includes an other layer, between the inner surface of the lamp envelope and the layer of luminescent material, for reflecting ultraviolet radiation which has passed through the layer of luminescent material back into said luminescent material for increasing the visible light output of the luminescent material. The ultraviolet reflecting layer comprises an agglomerated particulate material of predominantly gamma alumina having a primary crystallite size of less than about 0.05 μm.

According to one embodiment, the U.V. reflecting layer is a base, or pre-coat layer, disposed directly on the inner surface of the lamp envelope.

In a favorable embodiment, the primary crystallite size was about 0.01 μm obtained from a commercially available source. For this particle size, the U.V. reflecting layer preferably has a weight/surface area of said inner surface of between about 0.15 mg/cm$^2$ and about 0.3 mg/cm$^2$ for a T12 lamp with cool white phosphor. Above about 0.3 mg/cm$^2$ there is no further increase in the light output of the phosphor, so additional weight/thickness of the layer merely increases lamp cost without providing additional benefit. Below about 0.15 mg/cm$^2$ their is an insufficient design margin for meeting the EPACT standard with a standard cool white phosphor.

Non-luminescent alumina-containing layers between the inner surface of the lamp envelope and the luminescent phosphor layer have been used in the industry for various purposes. These purposes include, for example, (i) layers for reducing chemical reactions between the soda-lime glass used in fluorescent lamps and the phosphor layer so as to improve lumen maintenance and (ii) ultraviolet radiation reflecting layers for reflecting U.V. radiation back into a phosphor layer through which it has already passed.

U.S. Pat. No. 5,008,789 (Arai et al) discloses a fluorescent lamp employing the relatively expensive rare earth phosphors. In order to reduce lamp cost, such lamps often used an additional but less costly halophosphate layer to reduce the quantity of the rare earth phosphor. However, while preserving luminous efficacy, the halophosphate layer was found to be detrimental to the color rendering properties associated with the rare earth phosphors because of the halophosphates' inferior visible emissions. Arai et al employs a non-luminescent layer in place of a halophosphate layer, which has the effect of reflecting U.V. radiation back into the rare earth phosphor layer. This was found to maintain luminous efficacy without adversely impacting the relatively high color rendering characteristics provided by the rare earth phosphors. In one embodiment, the non-luminescent layer of Arai et al consists essentially of $\alpha$(alpha)-alumina having an average grain size of between about 0.05 μm and 2 μm. Arai teaches that its light reflecting layer is effective for counteracting the loss of lumens due to reduction in the thickness of the rare earth phosphor layer, but not for increasing total lamp lumens. It is disclosed that a slight reduction in lamp brightness may occur because of the increased light attenuation with increasing thickness and U.V. reflectance of its U.V. reflecting layer. Furthermore, Arai specifically teaches (i) that $\alpha$-alumina having a grain size of less than 0.05 μm is ineffectual at reflecting ultraviolet radiation because this grain size is smaller than the wavelength of the U.V. radiation and (ii) that higher luminous fluxes could not be obtained when $\gamma$(gamma)alumina was used instead of $\alpha$-alumina.

Accordingly, it was a surprise to find that the undercoat according to the invention increased lamp lumens as compared to a lamp with the identical phosphor layer and no pre-coat. This was particularly surprising in view of the fact that (i) Applicants base consists of gamma alumina, which Arai teaches is ineffective for increasing light output, and (ii) the grain size according to the present invention is smaller than that which Arai teaches is effective. Specifically, the particle size of about 0.01 μm according to the one embodiment is about five times smaller than Arai' lower limit for effectiveness.

U.S. Pat. No. 4,079,288 (Maloney et al) discloses a fluorescent lamp with another alumina undercoating of vapor formed spherical alumina particles having an individual particle size ranging from approximately 400 Angstroms to 5000 Angstroms in diameter (0.04 μm to 0.5 μm), and an average particle size of 0.135 μm. The alumina layer has light diffusion properties which scatters at least 99% of the visible radiation incident thereon from the adjacent phosphor layer. The alumina layer also functions to scatter U.V. radiation back into the phosphor layer to permit reduction in phosphor weight. The coating is applied by vaporizing, through rapid combustion, a pellet of solid aluminum isoproxide. While this technique may be practical for frosting a generally spherical incandescent lamp envelope as disclosed in Maloney's U.S. Pat. No. 3,842,306, it would be difficult to achieve a uniform layer on the inner surface of a narrow, elongate tubular envelope of a fluorescent lamp in a very high speed manufacturing environment because of the long narrow geometry. Applicant is not aware of the presence of such a vapor deposited coating in commercially available fluorescent lamps. By comparison, the undercoating according to the invention is applied by liquid suspension according to commonly employed techniques for applying phosphor layers on the interior surface of lamp envelopes.

Additionally, it should be noted that Maloney's '306 patent discloses the introduction of a preformed minute crystalline alumina material, specifically Alon C powder, into the combustion process of the aluminum isoproxide. The resulting larger agglomerate of the Alon C becomes interspersed in the matrix of spherical alumina and helps hide the filament. Maloney did not disclose this minute crystalline material for use in the fluorescent lamp of the '288 patent.

These and other features and advantages of the invention will be further described with reference to the following drawings, detailed description and claims.

DESCRIPTION OF THE PREFERRED EMBODIMENTS

Figure 1:
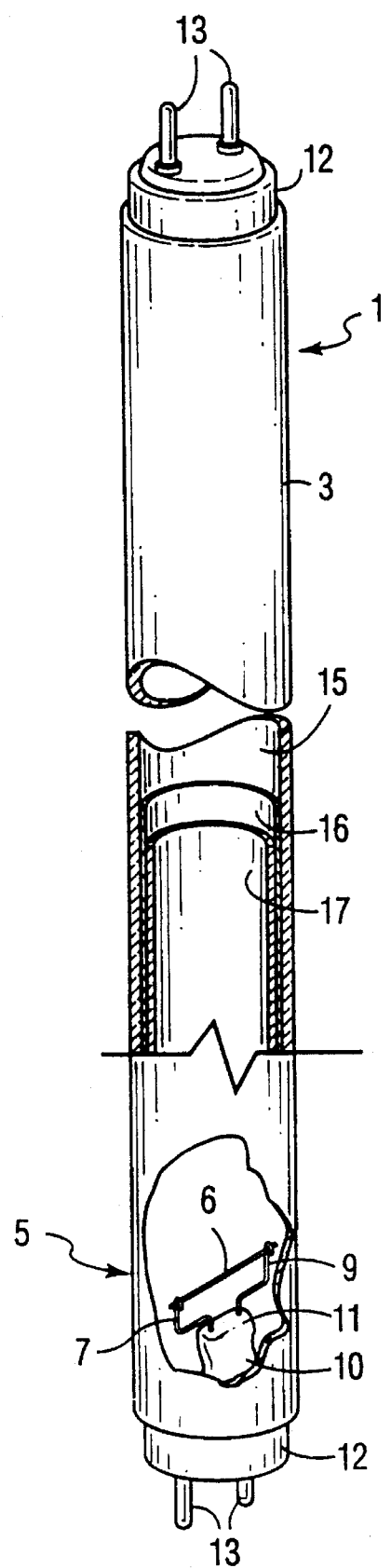
FIG. 1 is a perspective view of a fluorescent lamp, partly in cross-section, partly broken away, having an undercoat according to the invention.

FIG. 1 shows a low pressure mercury vapor fluorescent lamp 1 with an elongated outer envelope, or bulb, 3. The lamp includes a conventional electrode structure 5 at each end which includes a filament 6 supported on in-lead wires 7 and 9 which extend through a glass press seal 11 in a mount stem 10. The leads 7, 9 are connected to the pin-shaped contacts 13 of their respective bases 12 fixed at opposite ends of the lamp. The discharge-sustaining filling includes an inert gas such as argon, or a mixture of argon and other gases, at a low pressure in combination with a small quantity of mercury to sustain an arc discharge during lamp operation. The inner surface 15 of the outer envelope 3 is provided with an undercoat 16 of $\gamma$(gamma) alumina having a primary crystallite size of less than about 0.05 μm. A phosphor coating 17 is disposed over the undercoat 16. Both coatings extend the full length of the bulb, completely circumferentially around the bulb inner wall.

To better illustrate the improvement in light output characteristics obtained for a fluorescent lamp having the above undercoat, a number of F40T12 lamps were fabricated utilizing various weights of the above coating with a primary crystallite size of about 0.01 μm. The initial (100 hr) lumen output for these lamps are reported in Table I below:

TABLE I

| 0 gm base | | 0.1 gm base | | 0.2 gm base | | 0.3 gm base | |
| --- | --- | --- | --- | --- | --- | --- | --- |
| A | B | A | B | A | B | A | B |
| 4.64 | 2732 | 4.78 | 2805 | 4.61 | 2813 | 5.68 | 2974 |
| 5.50 | 2850 | 5.24 | 2850 | 4.68 | 2804 | 6.00 | 2982 |
| 6.42 | 2880 | 5.32 | 2860 | 4.94 | 2848 | 6.16 | 2970 |
| 6.84 | 2916 | 5.57 | 2860 | 5.14 | 2881 | 6.74 | 3036 |
| 7.16 | 2884 | 5.60 | 2892 | 5.42 | 2928 | 6.92 | 2996 |
| 7.83 | 2900 | 5.70 | 2890 | 5.42 | 2926 | 7.96 | 3022 |
| | | 6.84 | 2890 | 5.50 | 2942 | 8.04 | 2992 |
| | | 6.63 | 2952 | 5.72 | 2942 | | |
| | | 6.79 | 2928 | 5.93 | 2962 | | |
| | | 7.18 | 2940 | 6.24 | 2990 | | |
| | | 7.45 | 2980 | 6.44 | 2968 | | |
| | | | | 6.55 | 2980 | | |
| | | | | 6.92 | 3000 | | |
| | | | | 7.97 | 3000 | | |

In the table, column A represents the powder weight of the standard cool white halophosphate phosphor used per lamp and column B is the light output in Lumens. The cool white phosphor was $Ca_5(F, Cl)(PO_4)_3: S_b:M_n$. The heading at the top of each column is the weight per lamp of the above-mentioned 0.01 μm γ(Gamma) alumina base coat.

Figure 2:
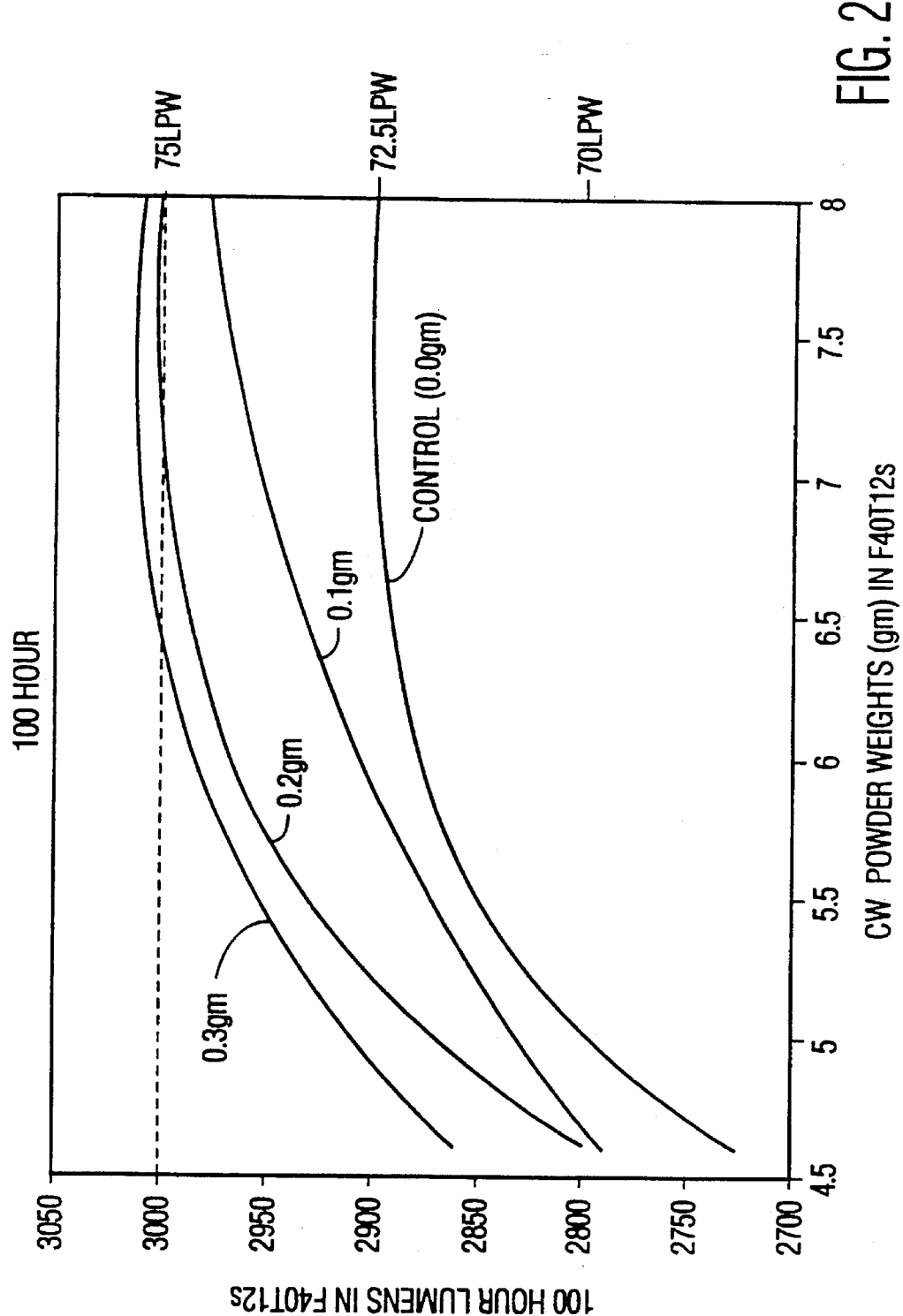
FIG. 2 is a graph of lumens verses phosphor coating weight for different base coat weights according to the invention in a F40T12 lamp.
Figure 3:
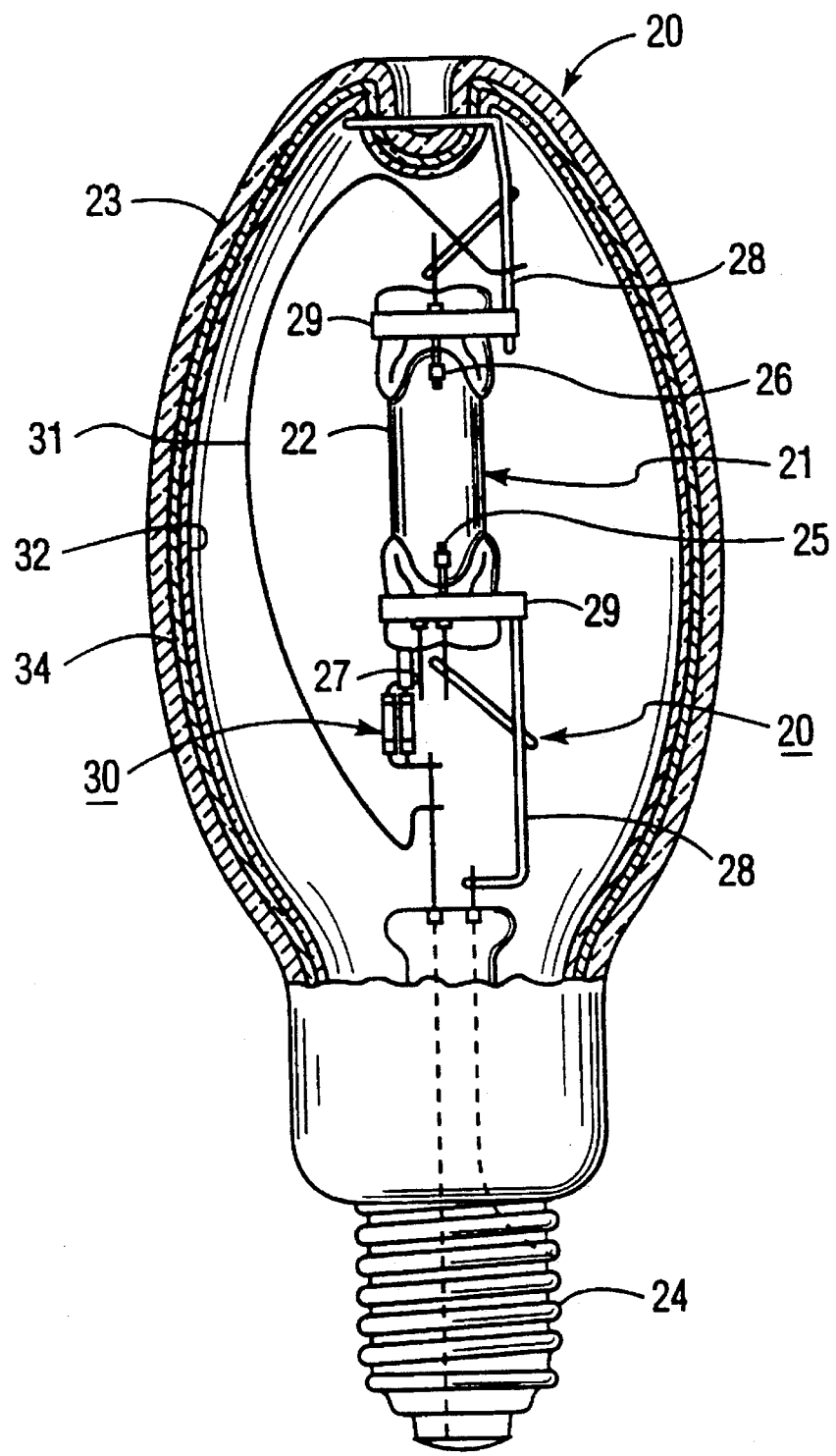
FIG. 3 is a perspective view, partly in cross-section, of a high-pressure mercury vapor lamp with the same undercoating in accordance with the invention.

The data of Table I is illustrated graphically in FIG. 2. The base coat of weight of 0.3 gm/lamp provided the highest lumens. For a 40W lamp, a lumen level of 3000 (illustrated by the dashed line) corresponds to an efficacy of 75 LPW, which is the minimum EPACT standard for a four foot 40 W fluorescent lamp. From FIG. 2 it can be seen that this efficacy is met for both 0.3 gm and 0.2 gm weights and is significantly higher than the 72.5 LPW obtained without the base coat according to the invention. While the minimum phosphor powder weight for attaining 75 LPW is lower for a higher base coat weight (about 6.4 gm for base coat of 0.3 gm and about 7.25 gm for a base coat of 0.2 gm), at the present time the standard cool white halophosphate phosphor is significantly less costly than the Aluminum oxide C material, so lamp cost is lowest with the lowest sufficient base coat weight.

It should be noted that the F40T12 was used as a test vehicle for demonstrating the increase in lamp lumens using the base coat according to the invention. Although the efficacy has been sufficiently raised, an F40T12 with the specified cool white phosphor will not meet the minimum color rendering (CRI>69) for this lamp type specified by EPACT. However, the effect is transferable to other lamps when weight per lamp is converted to weight/unit area. From FIG. 2, a minimum effective coating weight of about 0.2 gm/lamp was found to provide the necessary percent increase in lumens. This converts to about 0.15 mg/cm² of the inner surface of the lamp envelope (1400 cm² for F40T12). Though not shown in FIG. 2, it was found that at above about 0.4 gm/lanp (about 0.3 mg/cm²) no additional lumen increase was found, so additional base coat weight merely increased lamp cost without a further improvement in lumens. Base coats within this range were employed in an 8-ft F96T12 40 W CW lamp and were effective to increase its luminous efficacy from 77–78 LPW to above the minimum EPACT standard of 80 LPW. The minimum EPACT CRI for this lamp is only 45, so the lamp meets both EPACT requirements with the cool white phosphor and base coat according to the invention. The inner surface area of an 8-FT F96T12 is about 2800 cm².

The data in Table I was fitted to the curve described by the following equation:

$$Lumens = A - Be^{-CW} - DW$$

where W represent the weight of the cool white phosphor (mgs/lamp) and A, B, C and D are constants.

The constants A, B, C and D are listed in Table II below:

TABLE II

| Con-stant | Control 0.0 g | Control 0.1 | Control 0.2 | Control 0.3 |
| --- | --- | --- | --- | --- |
| A | 2.97e + 003 | 3.39e + 003 | 3.18e + 003 | 3.64e + 003 |
| B | 3.95e + 004 | 1.99e + 003 | 1.30e + 004 | 3.24e + 003 |
| C | 1.14e + 000 | 3.24e − 001 | 8.28e − 001 | 4.13e − 001 |
| D | 8.44e + 000 | 3.29e + 001 | 2.05e + 001 | 6.45e + 001 |

Base Coat Preparation/Application

The base coats mentioned above were prepared from dispersions of colloidal alumina commercially available from Degussa as Aluminum Oxide C. This material is made by the so-called Aerosol process. The resulting agglomerated particulate material has a primary crystallite size of 0.01 μm and is predominantly gamma alumina. A small amount of chloride ion and moisture is also present in the material.

The dispersions are most conveniently prepared using water to which various ingredients may also be added without substantially changing the benefits of the base coat. These additives may include various nonionic and or cationic surfactants and/or dispersants, such as organic and inorganic salts of aluminum or other metals or cations and/or binders such as are in common use in aqueous phosphor suspension systems. For increasing viscosity, binders of polyvinyl alcohol were found particularly useful and at the low concentrations employed were easily removed during lehring. A notable exception to the above is that alumina dispersions in general are colloidally incompatible with anionic surfactants, dispersants and binders. The density and viscosity of aqueous dispersions produced for casting layers of alumina of the desired weight is a function of the rate of drying and the amount of binder found convenient to employ.

The alumina layer can also be cast from organic solvent based dispersions if an adequate amount of shear is applied. Surfactants useful in that case should ideally behave as ionic dispersants as the strongly repulsive potentials experienced by alumina in water under the appropriate conditions are substantially absent in organic solvents. If a binder is desired any in common use in organic media could be used.

The dispersion is applied to the interior of a clean fluorescent tube in a manner known to the art. The way the applied dispersion is dried does not seem to influence the usefulness of the invention. However, the weight of the resulting alumina layer has a direction influence on the lamp output (as discussed above) and is a function of both the rate of drying and the density and viscosity of the dispersion employed.

The base coat may be lehred before the application of the phosphor layer. However, no advantages were found from this step, though no disadvantages were uncovered either.

It has been found experimentally that the alumina particles of the base coat 16 are not dislodged in the application of the phosphor layer if the aqueous dispersion contains any typical combination of surfactants, dispersants and binders or whether the base coat layer is lehred or not. It is advisable to lehr layers cast from organic binders as they are likely to be dislodged or dissolved by a subsequent coating of either an aqueous or non-aqueous suspension of the phosphor.

The phosphor layer is applied in a manner known to the art directly on the lehred or unlehred alumina base coat. The traction rate of the phosphor suspension is diminished by the presence of the base coat. The weight of the phosphor contained in this layer is found to bear a relationship proportional to the weight in the base coat.

The bulb coated as above is then lehred and finished into a lamp in the manner known to the art. The presence of the alumina base coat was not found to adversely influence any of the further lamp processing if the limit of weight per unit area as described above is observed.

Other Lamps

The alumina base coat according to the invention is useful for other lamps with a phosphor coating and U.V. emitting light source as well. Referring to FIG. 2, there is shown a high-pressure mercury vapor lamp 20 comprising a discharge vessel 21 enclosed within an outer glass envelope 23 provided with a screw base 24. The lamp envelope 23 is preferably of a conventional hard glass, such as borosilicate glass. The discharge vessel 21 includes quartz arc tube 22 provided with main electrodes 25 and 26 at each end, with an auxiliary electrode 27 being located adjacent to the main electrode 25. The discharge-sustaining filling in the arc tube 22 comprises a measured amount of mercury which is completely vaporized during operation in combination with an inert starting gas such as argon, all of which is conventional in such lamps. The arc tube is supported within the outer jacket by a frame including side rods 28, metal straps 29 and resistor-bridge assembly 30. The lower side rod 28 serves as a conductor between electrode 25 and the base shell. Field wire 31 connects the other electrode 26 to the center contact of the base. Starting electrode 27 is connected to main electrode 26 at the opposite end of the arc tube by the resistor assembly 30. A conventional phosphor coating 32 is applied over the gamma alumina undercoat 34 already described. Instead of a high pressure mercury arc tube, a metal halide arc tube may be used, which in addition to the mercury and inert starting gas, would contain vaporizable metal halides such as sodium, thallium and scandium.

Accordingly, Applicants have discovered that contrary to certain prior art teachings, a base coat consisting predominantly of γ(gamma) alumina particles is effective for increasing the light output of a phosphor layer. The increased light output occurs at particle sizes significantly smaller than that previously thought possible. The effect was demonstrated in an F40T12 cool white lamp using commercially available Aluminum oxide C with primary particle size of about 0.01 μm. It should be noted that this is the only known commercially available source of gamma alumina in the claimed size range, so additional tests with primary particle sizes above and below 0.01 μm could not be conducted. However, similar improvements in the size range less than 0.05 μm are expected based on the results of the 0.01 μm. Suitable base coat weights for use with other phosphors or fluorescent lamp types to meet the EPACT efficacy standards can be readily experimentally determined based on Applicant's teachings.

The difference between α-alumina and γ-alumina is in the distribution of the aluminum and oxygen in the oxide matrix. In α-alumina the distribution of the aluminum relative to the oxygen is very precise, whereas in γ-alumina there are significantly more errors. The mechanism by which gamma alumina and/or the much smaller particle size produces increased lumens is not understood at this time, but the effect is demonstrated in the above-tests.

While preferred embodiments of the invention have been shown and described, various other embodiments and modifications thereof will become apparent to those of ordinary skill in the art, and will fall within the scope of the invention as defined by the appended claims. Accordingly, the specification is to be considered to be illustrative only and not limiting.

I claim:

1. An electric lamp, comprising:
   a. a lamp envelope having an inner surface;
   b. means within the lamp envelope for generating ultraviolet radiation;
   c. a layer of a luminescent material adjacent the inner surface of the lamp envelope for generating visible light when impinged by said ultraviolet radiation; and
   d. an other layer, between said inner surface of said lamp envelope and said layer of luminescent material, for reflecting ultraviolet radiation which has passed through said layer of luminescent material back into said luminescent material for increasing the visible light output of said luminescent material, said ultraviolet reflecting material comprising an agglomerated particulate material of predominantly gamma alumina having a primary crystallite size of less than about 0.05 μm, said ultraviolet reflecting layer of predominantly gamma alumina having a weight/surface area of between about 0.15 mg/cm$^2$ and about 0.30 mg/cm$^2$.

2. A lamp according to claim 1, wherein said other layer is a base layer disposed directly on said inner surface of said lamp envelope.

3. A lamp according to claim 2, wherein said material has a primary crystallite size of about 0.01 μm.

4. A lamp according to claim 3, wherein said layer of luminescent material comprises a halophosphate phosphor.

5. A lamp according to claim 3, wherein said lamp is an F96T12 fluorescent lamp having an efficacy of at least 80 LPW.

6. A lamp according to claim 3, wherein said lamp is an F40T12 fluorescent lamp having an efficacy of at least 75 LPW.

7. A lamp according to claim 2, wherein said layer of luminescent material comprises a halophosphate phosphor.

8. A lamp according to claim 1, wherein said layer of luminescent material comprises a halophosphate phosphor.

9. A lamp according to claim 8, wherein said lamp is an F96T12 fluorescent lamp having an efficacy of at least 80 LPW.

10. A lamp according to claim 8, wherein said lamp is an F40T12 fluorescent lamp having an efficacy of at least 75 LPW.

11. A lamp according to claim 1, wherein said material has a primary crystallite size of about 0.01 μm.

12. A lamp according to claim 1, wherein said means for generating ultraviolet radiation is comprised by an arc tube disposed within said lamp envelope, said arc tube including a filling of an ionizable material and a rare gas and a pair of discharge electrodes between which a discharge takes place during lamp operation.

13. A lamp according to claim 1, wherein said means for generating ultraviolet radiation comprises a filling of an ionizable material and a rare gas within said lamp envelope and a pair of discharge electrodes each adjacent a respective sealed end of said discharge vessel.

14. A low pressure mercury vapor fluorescent lamp, comprising:
   a. a tubular, light transmissive lamp envelope having opposing sealed ends and an inner tubular surface;
   b. a filling of mercury and a rare gas;
   c. a pair of discharge electrodes each arranged at a respective sealed end of said lamp envelope;

d. means for connecting said discharge electrodes to a source of electric potential outside of said lamp envelope, whereby during lamp operation a gas discharge is maintained between said discharge electrodes, which gas discharge emits ultraviolet radiation;

e. a first, light transmissive and ultraviolet radiation reflecting layer disposed on said inner surface of said lamp envelope, said first layer comprising an agglomerated particulate material of predominantly gamma alumina having a primary crystallite size of about 0.01 μm, said first layer of material having a weight/surface area of between about 0.15 mg/cm$^2$ and about 0.3 mg/cm$^2$; and f. a second, layer of luminescent material disposed on said first layer.

15. A lamp according to claim 14, wherein said layer of luminescent material comprises a halophosphate phosphor.

16. A lamp according to claim 15, wherein said lamp is an F96T12 fluorescent lamp having an efficacy of at least 80 LPW.

17. A lamp according to claim 15, wherein said lamp is an F40T12 fluorescent lamp having an efficacy of at least 75 LPW.

18. An electric lamp, comprising:

a. a lamp envelope having an inner surface;

b. means within the lamp envelope for generating ultraviolet radiation;

c. a layer of a luminescent material adjacent the inner surface of the lamp envelope for generating visible light when impinged by said ultraviolet radiation; and d. an other layer, between said inner surface of said lamp envelope and said layer of luminescent material, for reflecting ultraviolet radiation which has passed through said layer of luminescent material back into said luminescent material for increasing the visible light output of said luminescent material, said ultraviolet reflecting material comprising an agglomerated particulate material having a primary crystallite size of less than about 0.05 μm, and having a weight/ surface area of between about 0.15mg/cm$^2$ and about 0.30 mg/cm$^2$.

19. A lamp according to claim 18, wherein said other layer is a base layer disposed directly on said inner surface of said lamp envelope.

20. A lamp according to claim 18, wherein said material has a primary crystallite size of about 0.01 μm.

* * * * *